United States Patent
Nakamura et al.

(10) Patent No.: US 6,574,415 B2
(45) Date of Patent: Jun. 3, 2003

(54) DIGITAL SIGNAL RECORDING APPARATUS AND METHOD THEREOF

(75) Inventors: Kenjiro Nakamura, Osaka (JP); Ryuichi Sakai, Osaka (JP); Kazuhide Yanase, Osaka (JP); Katsunori Mochida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/982,883

(22) Filed: Oct. 22, 2001

(65) Prior Publication Data

US 2002/0054751 A1 May 9, 2002

(30) Foreign Application Priority Data

Oct. 23, 2000 (JP) ........................................ 2000-322307

(51) Int. Cl.⁷ .................................................. H04N 5/91
(52) U.S. Cl. ......................................... 386/46; 386/124
(58) Field of Search .......................... 386/109, 46, 124, 386/33, 1, 40, 111, 112; H04N 5/91

(56) References Cited

U.S. PATENT DOCUMENTS

| | | | |
|---|---|---|---|
| 4,914,618 A | * | 4/1990 | Dodge ........................ 713/600 |
| 5,510,897 A | | 4/1996 | Ishida et al. |
| 5,784,215 A | * | 7/1998 | Wu et al. ........................ 360/8 |
| 5,887,115 A | * | 3/1999 | Boyce et al. ................ 386/129 |
| 5,953,489 A | * | 9/1999 | Park ........................... 386/109 |
| 6,115,537 A | * | 9/2000 | Yamada et al. ............. 386/109 |

FOREIGN PATENT DOCUMENTS

| | | |
|---|---|---|
| JP | 7-182783 | 7/1995 |
| JP | 9-237469 | 9/1997 |
| JP | 11120689 | 4/1999 |
| JP | 00-90571 | 3/2000 |
| JP | 1-128123 | 5/2001 |

OTHER PUBLICATIONS

English Language Abstract of JP 2001–128123.
English Language Abstract of JP 7–182783.
English Language Abstract of JP 11–120689.
English Language Abstract of JP 9–237469.

* cited by examiner

*Primary Examiner*—Vincent Boccio
*Assistant Examiner*—James A. Fletcher
(74) *Attorney, Agent, or Firm*—Greenblum & Bernstein, P.L.C.

(57) ABSTRACT

A digital signal is recorded with resolutions maintained and the disturbance of reproduced video and/or audio associated with changes of a recording rate of the digital signal is suppressed to minimum. A digital signal recording apparatus for recording a digital signal having a variable recording rate representing a recording speed, said apparatus comprising a receiving section which receives the digital signal; a recording rate detecting section which detects the recording rate of the digital signal received at the receiving section; a storage section which stores a detected recording rate when said detected recording rate is greater than a previously stored recording rate, whereby said storage section stores a maximum recording rate; and a recording section which is operable to record the digital signal in a recording medium based on the maximum recording rate stored in the storage section.

6 Claims, 4 Drawing Sheets

DIGITAL SIGNAL RECORDING APPARATUS AND METHOD THEREOF

BACKGROUND OF THE INVENTION

The present invention relates to a technique for recording digital signals such as BS digital broadcasting signals.

From the end of 2000, full-scale Broadcasting Satellite (BS) digital broadcasting has been begun, and the market is filled with expectations of high resolutions to be televised in BS digital broadcasting. At the same time, the need of a digital video tape recorder (hereinafter referred to as a digital VTR) which can record BS digital TV programs with their high resolutions left intact is increasing.

Now, a video recording apparatus which has been proposed to date will be described. FIG. 4 is a block diagram showing the configuration of a conventional video recording apparatus 40. Video recording apparatus 40 comprises a digital signal receiving section 41, digital signal recording section 42, operating section 43, and recording rate detecting section 44.

Composing elements of video recording apparatus 40 are specifically described. Digital signal receiving section 41 receives digital signals containing video information, audio information, and channel information from the outside. Recording rate detecting section 44 detects the recording rate based on the digital signals inputted from digital signal receiving section 41. "Recording rate" means speed to record the digital signals, which has a same meaning of the receiving speed of digital signals and of transmitting speed of the digital signals transmitted from the broadcasting station. Operating section 43 receives commands such as recording rate, start of recording, stopping from the user for digital signal recording section 42. Digital signal recording section 42 records, in the recording medium, the digital signal inputted from digital signal receiving section 41 based on the recording rate detected by the recording rate detecting section 44 and commands from operating section 43.

The broadcasting station can insert the information of maximum bit rate of the TV program for each program with respect to the digital signals of BS digital broadcasting. Whether to insert or not is at the option of the broadcasting station.

Based on these, the operation of video recording apparatus 40 will be described. First of all, when digital signal receiving section 41 is connected to the digital signal output of the digital tuner, digital signal receiving section 41 sends the inputted digital signal to digital signal recording section 42 and recording rate detecting section 44. Recording rate detecting section 44 detects the information if the information concerning the maximum bit rate is included in the inputted digital signal and detects the recording rate based on the detection results. The detection results are sent to digital signal recording section 42. Or when the user operates operating section 43 to set the recording rate to the automatic mode, operating section 43 transmits the setting to digital signal recording section 42.

Once the recording rate is set, the user times the start of the TV program he/she wants to record, operates operating section 43, and sends the recording start command to digital signal recording section 42. Digital signal recording section 42 begins digital recording at the recording rate instructed by recording rate detecting section 44 in conformity to the commands of the operating section.

In the case in which a specific recording rate is not set, recording rate detecting section 44 detects the speed of the digital signals received, and based on the detection, decides the recording rate. Consequently, when the receiving rate of the digital signal varies during recording, the recording must be temporarily stopped, the recording rate must be changed, and then, recording must be started. Alternatively, operating speed of the recording medium (e.g. rotating speed of a magnetic tape) must be changed, which corresponds to the recording rate, and the recording must be continued. With this sort of operation, every time the recording rate is changed, the TV program in recording is interrupted, and for the user, this phenomenon results in nuisance to see and is extremely unpleasant.

SUMMARY OF THE INVENTION

It is an object of the present invention to record the digital signals with their high resolutions maintained and suppress the disturbance of reproduced video and/or audio associated with changes of recording rate of digital signals to the minimum.

To achieve the above objects, a digital signal recording apparatus for recording a digital signal having a variable recording rate representing a recording speed, said apparatus comprises a receiving section which receives the digital signal; a recording rate detecting section which detects the recording rate of the digital signal received at the receiving section; a storage section which stores a detected recording rate when said detected recording rate is greater than a previously stored recording rate, whereby said storage section stores a maximum recording rate; and a recording section which is operable to record the digital signal in a recording medium based on the maximum recording rate stored in the storage section.

The storage section holds the maximum recording rate when the recording rate detected by the recording rate detecting section is less than the maximum recording rate.

The digital signal recording apparatus further comprises an operating section which enters, in response to a user's operation, a start command for starting recording of the digital signal and a stop command for stopping recording. The storage section may be reset in response to said start command, whereby the maximum recording rate is initialized.

The digital signal contains channel information for identifying the broadcasting station that transmits the digital signal and said receiving section detects changes of the channel information, and the storage section may be reset to the maximum recording rate when the receiving section detects a change in the channel information.

The digital signal may include a video signal and/or an audio signal.

To achieve the above objects, a digital signal recording method for recording a digital signal having a variable recording rate representing a recording speed, said method comprising: receiving a digital signal; detecting the recording rate of the digital signal received; storing a detected recording rate when said detected recording rate is greater than a previously stored recording rate, whereby the stored detected recording rate is a maximum recording rate; and recording the digital signal in a recording medium based on the maximum recording rate.

According to the present invention, a digital signal are recorded with the recording rate changed to a higher value only when the recording rate becomes higher than the previous recording rate and when the recording rate becomes lower than the previous recording rate, recording is continued without changing the recording rate. Thus, the frequency of interruptions of videos and/or voices caused by changes of the recording rate can be kept to minimum at the time of reproduction.

BRIEF DESCRIPTION OF THE DRAWINGS

These and other object and features of the present invention will become clear from the following description taken in conjunction with the preferred embodiments thereof with reference to the accompanying drawings, in which.

DETAILED DESCRIPTION OF THE PREFERRED EMBODIMENTS

The preferred embodiments of the present invention are described below with reference to the accompanying FIGS.

In the present embodiment, a recording apparatus which records digital signals will be described. The digital signals contains video signals of BS digital broadcasting programs.

First of all, digital signals are described. Digital signals vary the transmission speed in accordance with the resolution of the contents the digital signal represents. Consequently, receiving speed on the receiving side and recording rate vary. The "recording rate" means speed required for recording the digital signals received without degrading the resolution. For example, with respect to the video, the recording rate for securing the high-definition TV resolutions is approximately 28 Mbps, the recording rate for securing the video definition of standard resolution is approximately 14 Mbps, and the recording rate for securing the video definition of low resolution with special emphasis placed on the recording time is approximately 4.7 Mbps. As described later, the recording rate can be specified by detecting the frequency of the signals received. When a program with different recording rate is continually recorded, naturally, the recording rate changes during recording. However, the recording rate may be varied in the same program.

When video is contained in the program broadcasted, in general, the broadcasting station inserts the information that can identify the kind of the video characteristics (e.g. resolutions such as 1125i, 750P, 525P, 525i, etc.). In addition, in the digital signal, the channel information (program#number) that can identify the broadcasting station is also inserted. By detecting the channel information, it is possible to identify from which broadcasting station the digital signals being received are transmitted.

Figure 1:
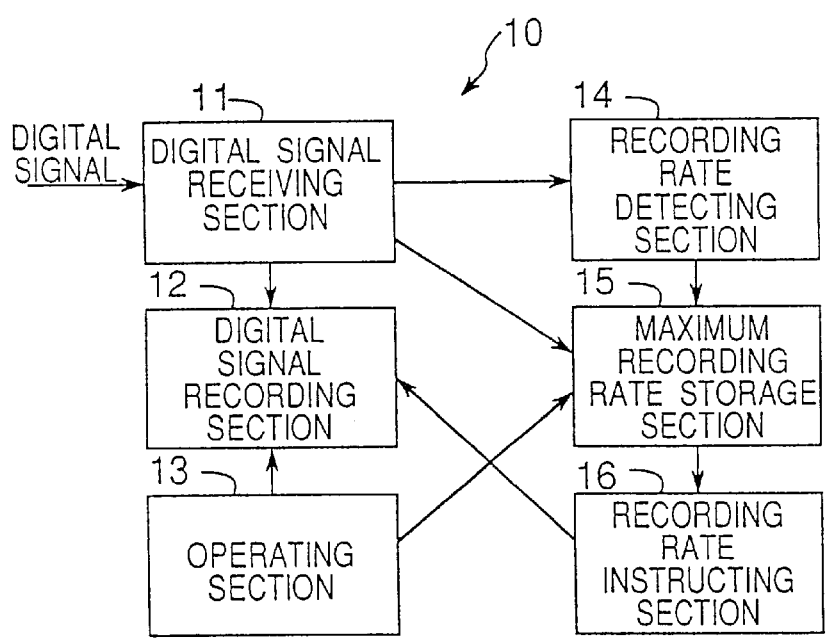
FIG. 1 is a block diagram of a configuration of the video recording apparatus.

Now, description will be made on the video recording apparatus according to the present embodiment. FIG. 1 is a block diagram showing the configuration of video recording apparatus 10. Video recording apparatus 10 is, for example, a digital VTR of the D-VHS system (a trademark of Victor Co. of Japan, Ltd.) that records and reproduces BS digital TV broadcasting programs. Video recording apparatus 10 comprises a digital signal receiving section 11, digital signal recording section 12, operating section 13, recording rate detecting section 14, maximum recording rate storage section 15, and recording rate instructing section 16.

Now, each component of video recording apparatus 10 is specifically described. First of all, digital signal receiving section 11 receives digital signals containing video information, audio information, and channel information, etc. of a program via the outside (for example, antenna).

Recording rate detecting section 14 detects the video rate in accordance with the digital signal entered from digital signal receiving section 11. The term "recording rate" has the same meaning as receiving speed of the digital signal or as transmission speed of the digital signal transmitted from the broadcasting station. The receiving speed of the digital signal can be obtained by detecting the radio signal received and identifying the frequency.

Maximum recording rate storage section 15 stores a maximum value of the recording rate. More specifically, maximum recording rate storage section 15 first compares the present recording rate detected by recording rate detecting section 14 and the stored maximum recording rate. As a result of comparison, if the present recording rate is greater than the stored maximum recording rate, the present recording rate is updated as the maximum vide-taping rate. Updating the maximum recording rate takes place from the start of recording to the end, or, from the start of recording until the channel is changed. The start and the end of recording are inputted by the user from operating section 13. Or, in the case of reserved recording, the control section (not shown) of video recording apparatus 10 instructs in accordance with the preset reserved time. On the other hand, whether the channel is changed or not is known by detecting changes of the channel information contained in the digital signal. The change of the channel information may be detected by either of digital signal receiving section 11 or recording rate detecting section 14.

Recording rate instructing section 16 reads the maximum recording rate stored in maximum recording rate storage section 15 and sends to digital signal recording section 12. Digital signal recording section 12 records the digital signal in the recording media by the maximum recording rate received from recording rate instructing section 16. The recording media includes, for example, magnetic recording media such as magnetic tape, etc. and optical recording media such as DVD, etc. For example, when the recording media is a magnetic tape, the magnetic tape is rotated at the rotating speed that corresponds to the maximum recording rate and records digital signals. Consequently, digital signal recording section 12 constantly records digital signals at the maximum recording rate until then. In other words, digital signal recording section 12 does not change to the low rate even if the maximum value of the recording bit rate of the digital signal or the recording bit rate itself frequently varies during recording the digital signals (that is, during recording the program).

It is noted that the digital signal recording section 12 can record digital signals at the recording rate specified by the user by the use of operating section 13. Operating section 13 receives the commands from the users as to the recording rate desired to be used, start and stop of recording, etc., and sends the commands to digital signal recording section 12.

Figure 2:
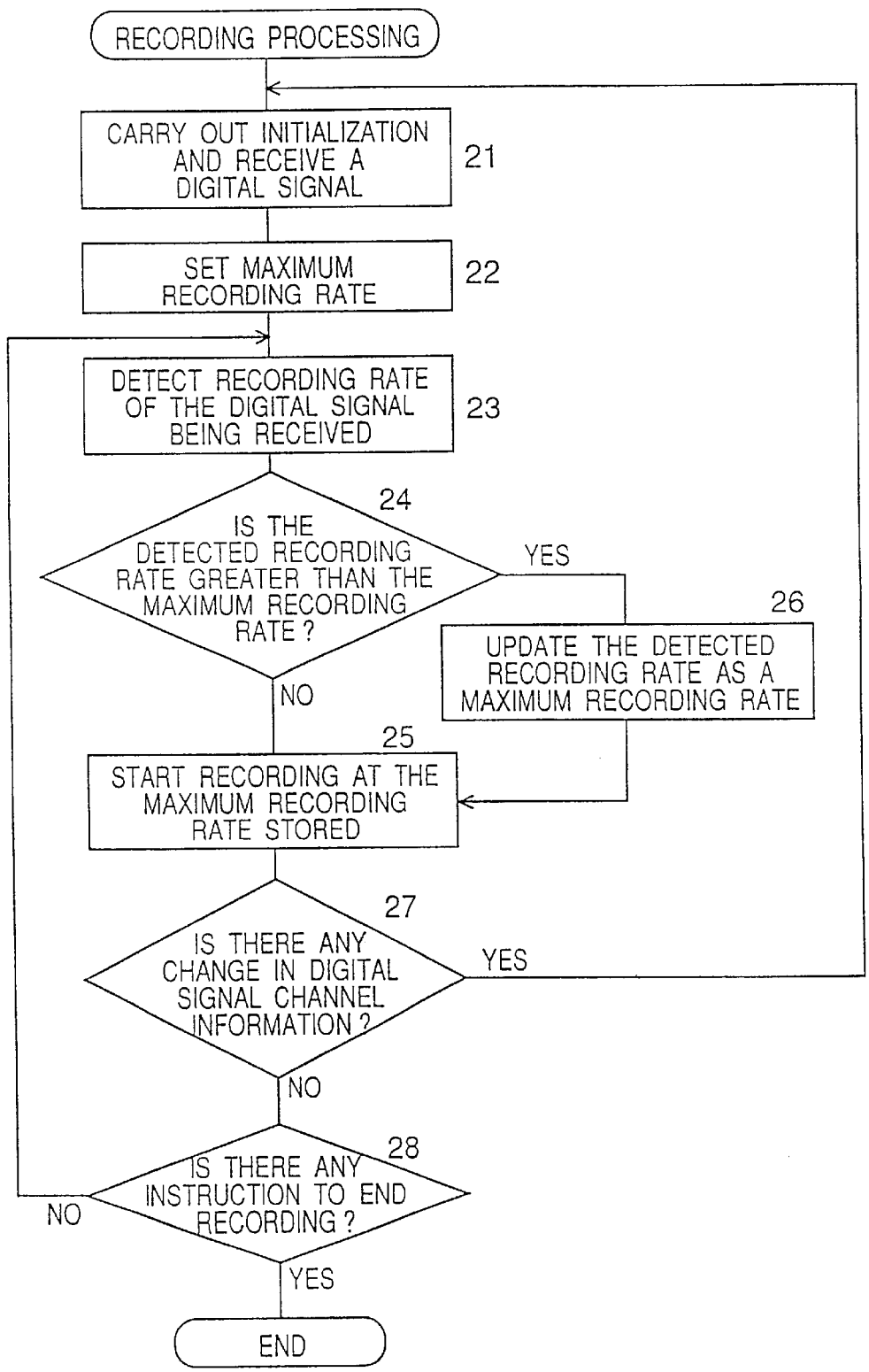
FIG. 2 is a flow chart of an operation of the video recording apparatus.

Referring now to FIG. 2, an operation of video recording apparatus 10 (FIG. 1) will be described. FIG. 2 is a flow chart showing the operation of video recording apparatus 10 (FIG. 1). At first, when the command to start recording is received, the control section (not shown) of video recording apparatus 10 (FIG. 1) generates the initializing signal and initializes the storage contents of maximum recording rate storage section 15 (FIG. 1). Reception and transmission of a digital signal is started by using digital signal receiving section 11 (FIG. 1) (Step 21). Maximum recording rate storage section 15 (FIG. 1) stores the recording rate of the digital signal received as the maximum recording rate. The minimum recording rate that can be set, or the recording rate set by the user as a default setting may be stored as the initial maximum recording rate.

As described above, there is a case in which the digital signal recording rate may be varied during recording a program. Consequently, the recording rate detecting section 14 (FIG. 1) detects the recording rate of the digital signal being received at specified intervals (for example, 1 second) (Step 23). Maximum recording rate storage section 15 (FIG. 1) detects whether the recording rate detected by recording rate detecting section 14 (FIG. 1) is higher or lower than the maximum recording rate stored in maximum recording rate storage section 15 (FIG. 1) (step 24).

If the recording rate is lower than the maximum recording rate, recording rate instructing section 16 (FIG. 1) holds the maximum recording rate stored in maximum recording rate storage section 15 (FIG. 1) without updating and transmits the maximum recording rate to digital signal recording section 12 (FIG. 1). Digital signal recording section 12 (FIG. 1) starts recording the digital signal at the maximum recording rate (Step 25).

On the other hand, when the recording rate is higher than the maximum recording rate, maximum recording rate storage section 15 (FIG. 1) updates the recording rate as the maximum recording rate (Step 26). Thereafter, the digital signal recording section 12 (FIG. 1) starts recording the digital signal at the maximum recording rate in the procedure of Step 25 as described above.

Then, recording rate detecting section 14 (FIG. 1) or the control section (not shown) detects whether the digital signal channel information is changed or not (Step 27). If the section detects that the channel information is changed, processing returns to Step 21. That is, digital signal receiving section 11 (FIG. 1) generates the initializing signal and initializes the storage contents of maximum recording rate storage section 15 (FIG. 1) initializes the storage contents. This is to carry out processing because recording is newly begun. When the channel information is changed, the optimum recording rate can be newly set by initializing maximum recording rate storage section 15 (FIG. 1).

If it is detected that the channel information is not changed, then, whether an command to finish recording is given or not is determined (Step 28). The command to finish recording is transmitted by the user using operating section 13 (FIG. 1) or transmitted by the control section (not shown) by the arrival of the reserved ending time of recording. If there is no command to finish recording, processing returns to Step 23, and acquisition of the recording rate and recording of the digital signal are continued. It is noted that the digital signal is temporarily stored in a buffer (not shown) without recording in the recording media immediately after the receipt of the digital signal. When the recording rate is changed, the specified processing of changing of encoding process, etc. is required, but by storing the processed data in the buffer (not shown), signals can be recorded continuously without interruption.

Figure 3:
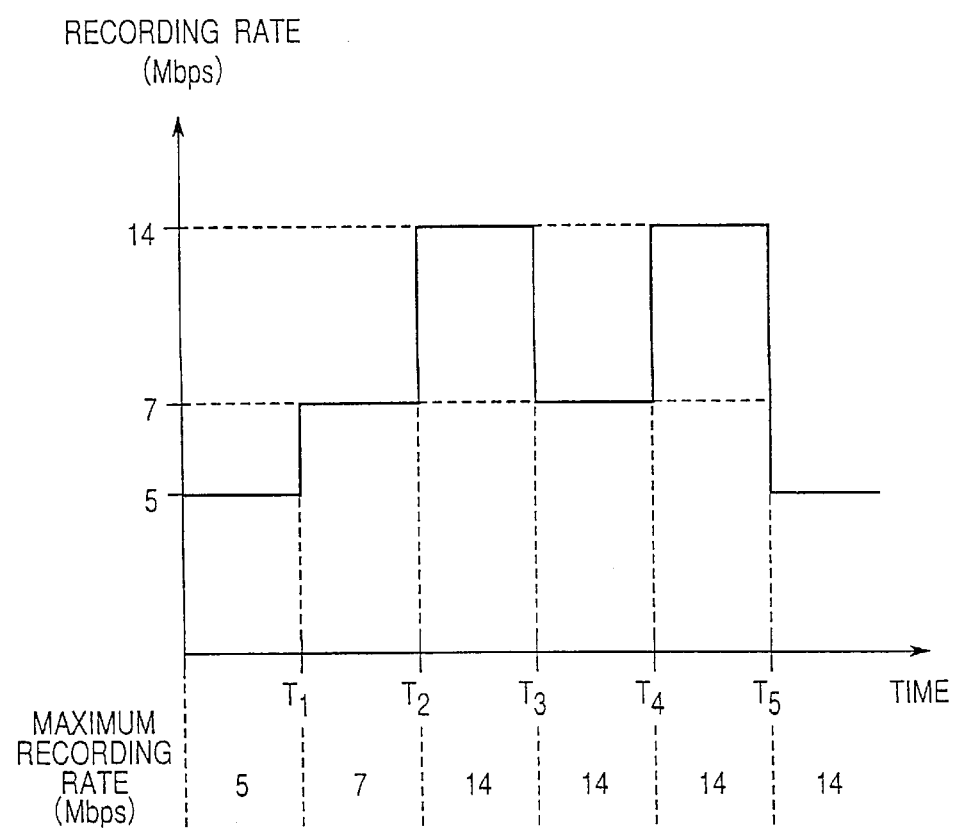
FIG. 3 is an diagram of the relationship between the digital signal recording rate and the maximum recording rate.
Figure 4:
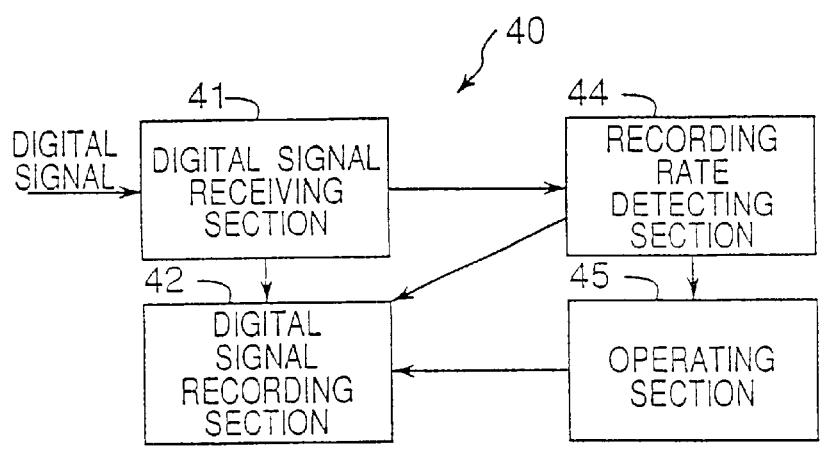
FIG. 4 is a block diagram of a configuration of a conventional video recording apparatus.

By the operation of video recording apparatus 10 (FIG. 1) as described above, how the maximum recording rate is updated will be specifically described. FIG. 3 is an illustration describing the relationship between the digital signal recording rate and the maximum recording rate. As shown in the graph, assume that the recording rate of the received digital signal(s) varies in accordance with the time. A time interval from T1 to T2 is expressed as [T1, T2].

At time [0, T1], [T1, T2], [T2, T3], the maximum recording rate is updated to higher values such as 5 Mbps, 7 Mbps, and 14 Mbps in conformity to the recording rate of the digital signal(s). Although, at time [T3, T4], the recording rate decreases from 14 Mbps to 7 Mbps, the maximum recording rate is not changed and kept to 14 Mbps. This is same as time T5 and after.

Note that when the recording rate of the digital signal(s) is changed during recording, videos and voices are interrupted at the time of reproducing the changed section, and it takes some time to be reproduced again. The reason is that changes, etc. of encoding processing are required. For example, because in the video recorded by MPEG2 standard, I picture search and acquisition of B picture and P picture are required, it takes time to display videos again.

Consequently, by above-mentioned processing, even when the recording rate of the digital signal(s) becomes higher than before, signal(s) can be reliably recorded and because there are less changes in the recording rate, videos and voices are less interrupted.

As described above, video recording apparatus 10 (FIG. 1) records a digital signal at the maximum recording rate. When the recording rate of the digital signal being received is higher than the maximum recording rate, the recording rate is updated, and the digital signal is recorded at a higher recording rate after updating. On the other hand, the recording rate of the digital signal being received is lower than the maximum recording rate, recording is continued at the maximum recording rate as it is without changing the recording rate. Even when the maximum bit rate of the digital signal under recording or the bit rate of the digital signal frequently changes, the number of interrupting videos and voices caused by changes of recording rate can be kept to the minimum at the time of reproduction. Because the storage contents of maximum recording rate storage section 15 (FIG. 1) is initialized every time recording is started, the optimum recording rate can be constantly set.

In the foregoing description, recording rate detecting section 14 (FIG. 1) acquires the recording rate in conformity to the receiving frequency of digital signal. However, if the information concerning the digital signal bit rate (for example, information concerning the maximum bit rate) is contained, the recording rate may be acquired by the use of the information. The information concerning the kind of the video signals may be detected and the recording rate may be detected. Even in these cases, the similar effects can be obtained.

The description was made with the case in which the recording media is a magnetic tape taken for an example, but the recording media may be, for example, DVD. To briefly describe the case for recording digital signal in DVD, the digital signal entered is temporarily stored in the write buffer, and every time the buffer becomes full, the signals are written in DVD rotated at a specified speed. That is, irrespective of the recording rate, the data will be continuously recorded. However, since encoding processing, etc. varies in accordance with changes of the recording rate, processing described in FIG. 2 carried out by the DVD recorder can suppress the change of the recording rate to the minimum, and therefore, the frequency of interrupting videos and voices caused by changes of the recording rate can be kept to minimum at the time of reproduction. It is noted that when discontinuity of the data is generated not by the kind of recording media but in accordance with changes of the recording mode and videos and/or voices ate interrupted during reproduction, it is easily understood that the present invention is applicable.

In the example mentioned above, the description was made with video signals primarily contained in the digital signal. However, signals may represent only videos or voices.

The processing operation (FIG. 2) of video recording apparatus 10 (FIG. 1) described in the present embodiment can be achieved as a computer program for allowing the computer to execute such processing. The computer program is recorded in the magnetic recording media such as optical discs, flexible discs such as CD, DVD, etc. or semiconductor recording media such a flush memory, etc. The computer program is transmitted as electrical signals via networks such as Internet, etc.

The present disclosure relates to subject matter contained in priority Japanese Patent Application No. 2000-322307, filed on Oct. 23, 2000, the contents of which is herein expressly incorporated by reference in its entirety.

What is claimed is:

1. A digital signal recording apparatus for recording a digital signal having a variable recording rate representing a recording speed, said apparatus comprising:
   a receiving section which receives the digital signal;
   a recording rate detecting section which detects the recording rate of the digital signal received at the receiving section;
   a storage section which stores a detected recording rate as a maximum recording rate when said detected recording rate is greater than a previously stored maximum recording rate, the storage section holding the maximum recording rate when the recording rate detected by the recording rate detecting section is less than the maximum recording rate; and
   a recording section which is operable to record the digital signal in a recording medium based on the maximum recording rate stored in the storage section.

2. A digital signal recording apparatus as described in claim 1 further comprising:
   an operating section which enters, in response to a user's operation, a start command for starting recording of the digital signal and a stop command for stopping recording,
   said storage section being reset in response to said start command, whereby the maximum recording rate is initialized.

3. A digital signal recording apparatus as described in claim 1, wherein the digital signal contains channel information for identifying the broadcasting station that transmits the digital signal;
   wherein said receiving section detects changes of the channel information; and
   wherein the storage section is reset to initialize the maximum recording rate when the receiving section detects a change in the channel information.

4. A digital signal recording apparatus as described in claim 1, wherein the digital signal includes a video signal.

5. A digital signal recording apparatus as described in claim 1, wherein the digital signal includes an audio signal.

6. A digital signal recording method for recording a digital signal having a variable recording rate representing a recording speed, said method comprising:
   receiving a digital signal;
   detecting the recording rate of the digital signal received;
   storing a detected recording rate as a maximum recording rate when said detected recording rate is greater than a previously stored maximum recording rate;
   holding the maximum recording rate when the recording rate detected by the recording rate detecting section is less than the maximum recording rate; and
   recording the digital signal in a recording medium based on the maximum recording rate.

* * * * *

UNITED STATES PATENT AND TRADEMARK OFFICE
CERTIFICATE OF CORRECTION

PATENT NO.    : 6,574,415 B2
DATED         : June 3, 2003
INVENTOR(S)   : K. Nakamura et al.

It is certified that error appears in the above-identified patent and that said Letters Patent is hereby corrected as shown below:

<u>Title page,</u>
Item [56], References Cited, FOREIGN PATENT DOCUMENTS,
"00-90571" should be -- 2000-90571 --.

Signed and Sealed this

Fourth Day of November, 2003

JAMES E. ROGAN
*Director of the United States Patent and Trademark Office*